Dec. 21, 1926.
V. A. F. NIELSEN
1,611,667
REPAIR TOOL FOR AUTOMOBILE INNER TUBES
Filed Dec. 12, 1925
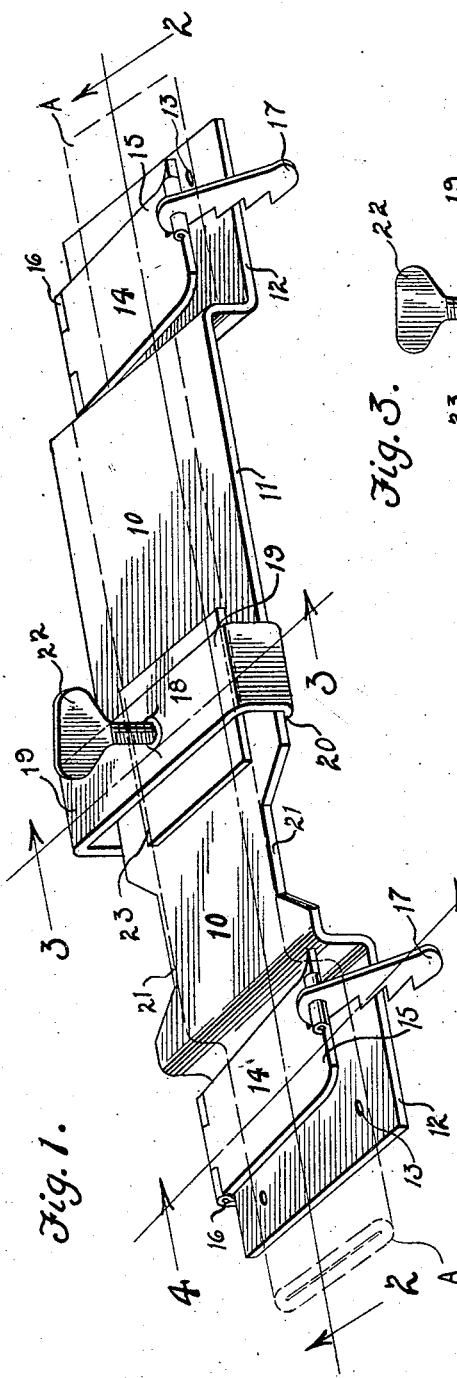
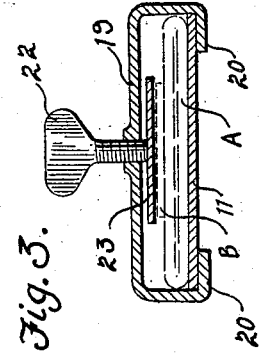
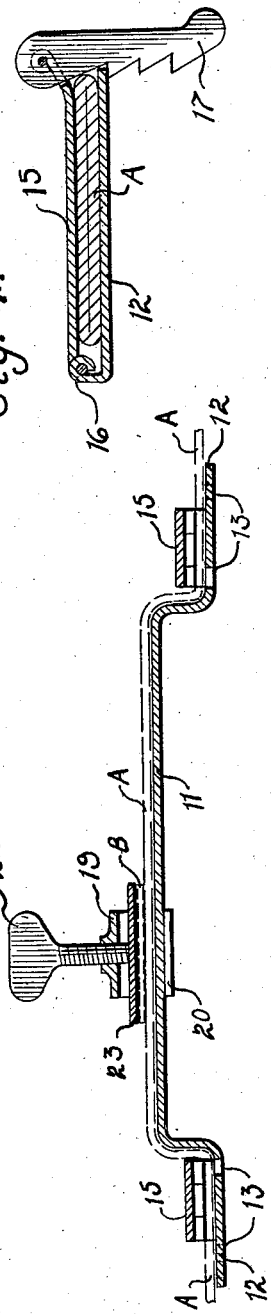
Viggo A. F. Nielsen. INVENTOR
BY Victor J. Evans
ATTORNEY Patented Dec. 21, 1926.

1,611,667

UNITED STATES PATENT OFFICE.

VIGGO A. F. NIELSEN, OF BROOKLYN, NEW YORK.

REPAIR TOOL FOR AUTOMOBILE INNER TUBES.

Application filed December 12, 1925. Serial No. 75,075.

This invention relates to improvements in repair tools for automobile inner tubes.

An object of the invention resides in a tool which may be carried in the tool box of an automobile for the purpose of applying patches to defective inner tubes and which if desired, may be installed upon a workbench in a garage for use as a permanent fixture in the repair of inner tubes.

Another object of the invention is to provide a repair tool for inner tubes which will facilitate the quick attachment of the patch to the defective tube and which holds the patch in a set position after vulcanization of the patch to the tube.

A further object of the invention resides in a repair tool for inner tubes which provides a clamping means for holding the tube in a taut condition adjacent that part of the tube to be repaired, and a means for clamping the patch upon the tube during and after vulcanization.

A still further object of the invention is to provide a repair tool for inner tubes which is simple in construction, inexpensive of manufacture and easy of operation.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a perspective view of my repair tool showing an inner tube held thereby.

Figure 2 is a vertical longitudinal sectional view on the line 2—2 of Figure 1.

Figure 3 is a vertical transverse sectional view on the line 3—3 of Figure 1.

Figure 4 is a similar view on the line 4—4 of Figure 1.

Referring more particularly to the drawing, the reference numeral 10 designates my improved repair tool in its entirety and which includes an elongated table or platform 11 having its opposite ends offset to provide feet 12 for supporting the major portion of the table in spaced relation from a supporting structure. The feet are provided with openings 13 for the passage of screws should it be desired to secure the tool upon a workbench, but it will be appreciated that the device may be conveniently carried in the tool chest of an automobile for emergency purposes should it become necessary to repair the inner tube while touring.

Carried by each of the feet 12 is a tube clamping means 14 which comprises a plate 15 hinged adjacent one of the longitudinal edges of the table as at 16. The free end of each plate carries a pivoted toothed bar 17, the teeth of which are adapted to engage the opposite edges of the table when the plate is in a position for clamping the tube thereon. By providing a clamping means at each end of the table and positioning the same below the plane of the working surface of the table, it is possible to hold the tube in a taut condition adjacent that portion of the tube to be repaired.

When that part of the tube to be repaired has been placed upon the table and is held by the clamping means 14, a suitable patch clamping device 18 is applied. The device 18 comprises a bridge piece 19 having flanges 20 which engage with the underside of the raised portion of the table. The bridge piece is applied by passing the flanges through opposite notches 21 in the side edges of the table and the same is moved longitudinally over the table to a position overlying the patch. In the drawings, I have shown a portion of an inner tube A which is placed on the table prior to the application of the patch clamping device 18. The patch B is next applied over the spot on the tube to be repaired and the clamping device is then brought into position for overlying the patch. The bridge piece 19 carries a clamping screw 22 which is adapted to be screwed down against a plate 23 which is inserted over the patch B. When the screw 22 is turned to a clamping position, the pressure therefrom will be imparted to the plate whereby the patch is held in place for vulcanizing to the tube, and after vulcanization the clamping device may be left undisturbed until the patch is set and it is safe to remove the same. To remove the inner tube from the device, it will be understood that the clamping means 14 is first released and the bridge removed from the table, whereupon the tube is free to be lifted therefrom.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. A repair tool for inner tubes comprising a table, a pair of hinged plates arranged in spaced relation thereon, co-acting means between said plates and said table for holding said plates in clamping engagement with an inner tube to be held thereon, and a patch clamp slidably mounted on said table intermediate said plates.

2. A repair tool for inner tubes comprising a table, a pair of hinged plates arranged in spaced relation thereon, co-acting means between said plates and said table for holding said plates in clamping engagement with an inner tube to be held thereon, said means including a toothed bar carried by each plate for engagement with one edge of said table, and a patch clamp slidably mounted on said table intermediate said plates.

3. A repair tool for inner tubes comprising an elongated table, tube holding means for supporting a portion of an inner tube in a taut condition across said table, a bridge piece slidable over said table, and a clamping screw carried by said bridge piece.

4. A repair tool for inner tubes comprising an elongated table, tube holding means for supporting a portion of an inner tube in a taut condition across said table, a bridge piece slidable over said table, a clamping screw carried by said bridge piece, and a plate adapted to be applied over a patch to be vulcanized to an inner tube and engageable by said clamping screw.

5. A repair tool for inner tubes comprising an elongated table having opposed notches therein along opposite edges, means for supporting said table in spaced relation to a supporting structure, tube holding means, a bridge member having inwardly extending flanges insertible through said notches for allowing said member to be operatively associated with said table, and a clamping screw carried by said bridge member for clamping a patch against a tube adapted to be supported on said table.

In testimony whereof I have affixed my signature.

VIGGO A. F. NIELSEN.